US009972869B2

United States Patent
Bober

(10) Patent No.: US 9,972,869 B2
(45) Date of Patent: *May 15, 2018

(54) BATTERY CELL ASSEMBLY HAVING IMPROVED THERMAL SENSING CAPABILITY

(71) Applicant: LG Chem, Ltd., Seoul (KR)

(72) Inventor: Greg Bober, Saint Clair Shores, MI (US)

(73) Assignee: LG Chem, Ltd., Seoul (KR)

( * ) Notice: Subject to any disclaimer, the term of this patent is extended or adjusted under 35 U.S.C. 154(b) by 333 days.

This patent is subject to a terminal disclaimer.

(21) Appl. No.: 14/169,525

(22) Filed: Jan. 31, 2014

(65) Prior Publication Data

US 2015/0221992 A1    Aug. 6, 2015

(51) Int. Cl.
*H01M 10/42*  (2006.01)
*H01M 10/6571*  (2014.01)
(Continued)

(52) U.S. Cl.
CPC .......... *H01M 10/425* (2013.01); *G01K 7/16* (2013.01); *H01M 10/486* (2013.01); *H01M 10/615* (2015.04); *H01M 10/647* (2015.04); *H01M 10/6571* (2015.04); *H01M 2010/4271* (2013.01); *H01M 2010/4278* (2013.01)

(58) Field of Classification Search
None
See application file for complete search history.

(56) References Cited

U.S. PATENT DOCUMENTS 4,445,109 A * 4/1984 Naganoma ............... G01K 7/22
338/22 R
5,534,792 A * 7/1996 Lillis ................... H04L 25/0298
326/30
(Continued)

FOREIGN PATENT DOCUMENTS

EP          0795206 B1    4/1999
JP       2002233048 A    8/2002
(Continued)

OTHER PUBLICATIONS

U.S. Appl. No. 14/019,577, filed Sep. 6, 2013 entitled Battery Cell Assembly.
(Continued)

*Primary Examiner* — Wojciech Haske
(74) *Attorney, Agent, or Firm* — Buckert Patent & Trademark Law Firm PC;; John F. Buckert

(57) ABSTRACT

A battery cell assembly having a battery cell and a thin profile sensor is provided. The assembly includes a battery cell having a housing and first and second electrical terminals extending from the housing. The assembly further includes a thin profile sensor having a microprocessor and a sensing circuit. The sensing circuit is coupled directly to the housing. The sensing circuit generates a signal that is indicative of an operational parameter value of the battery cell. The microprocessor is programmed to determine the operational parameter value based on the signal from the sensing circuit. The assembly further includes a protective layer coupled to the thin profile sensor such that the sensor is disposed between the protective layer and the housing.

18 Claims, 8 Drawing Sheets

(51) Int. Cl.
*H01M 10/647* (2014.01)
*H01M 10/48* (2006.01)
*G01K 7/16* (2006.01)
*H01M 10/615* (2014.01)

(56) References Cited

U.S. PATENT DOCUMENTS

| | | | |
|---|---|---|---|
| 6,152,597 A * | 11/2000 | Potega | G01K 1/02 |
| | | | 324/104 |
| 6,469,512 B2 | 10/2002 | Singh et al. | |
| 6,884,965 B2 | 4/2005 | Nelson et al. | |
| 7,053,344 B1 | 5/2006 | Surjan et al. | |
| 7,202,444 B2 | 4/2007 | Bulgajewski | |
| 7,285,748 B2 | 10/2007 | Nelson et al. | |
| 7,479,786 B2 * | 1/2009 | Woo | H01M 10/482 |
| | | | 307/150 |
| 8,264,202 B2 | 9/2012 | Sahu et al. | |
| 8,341,449 B2 | 12/2012 | Daniel et al. | |
| 8,449,998 B2 | 5/2013 | Koetting | |
| 8,489,264 B2 | 7/2013 | Morita et al. | |
| 8,519,674 B2 | 8/2013 | Anderson et al. | |
| 8,519,716 B2 | 8/2013 | Kurata | |
| 2003/0102296 A1* | 6/2003 | Nelson | B60N 2/5685 |
| | | | 219/217 |
| 2003/0122527 A1* | 7/2003 | Yugo | H01M 10/443 |
| | | | 320/150 |
| 2005/0103775 A1* | 5/2005 | Nelson | B60N 2/5685 |
| | | | 219/548 |
| 2005/0134232 A1* | 6/2005 | Yamamoto | H01M 10/486 |
| | | | 320/150 |
| 2006/0289421 A1 | 12/2006 | Axinte et al. | |
| 2007/0111091 A1 | 5/2007 | Hiratsuka et al. | |
| 2008/0254348 A1 | 10/2008 | Hatta et al. | |
| 2010/0104929 A1 | 4/2010 | Gutsch | |
| 2010/0209768 A1 | 8/2010 | Ahn et al. | |
| 2012/0242144 A1* | 9/2012 | Chorian | H01M 2/34 |
| | | | 307/9.1 |
| 2013/0004811 A1* | 1/2013 | Banerjee | G01K 7/16 |
| | | | 429/62 |
| 2013/0288091 A1 | 10/2013 | Tsubaki et al. | |
| 2014/0014403 A1 | 1/2014 | Miller et al. | |
| 2015/0072190 A1 | 3/2015 | Bober | |
| 2015/0094970 A1 | 4/2015 | Bober | |

FOREIGN PATENT DOCUMENTS

| | | |
|---|---|---|
| JP | 2003129927 A | 5/2003 |
| JP | 2005183098 A | 7/2005 |
| JP | 2007157726 A | 6/2007 |
| JP | 2010244844 A | 10/2010 |
| JP | 2011165391 A | 8/2011 |
| JP | 2012507132 A | 3/2012 |
| JP | 2013123357 | 1/2013 |
| JP | 2013077433 A | 4/2013 |
| JP | 2013122938 A | 6/2013 |
| JP | 2013211436 A | 10/2013 |
| KR | 20100003143 | 1/2010 |
| KR | 101224704 | 5/2011 |
| KR | 20120005366 | 1/2012 |
| KR | 20130004042 A | 1/2013 |
| WO | 2013147292 A1 | 10/2013 |
| WO | 2013147659 A1 | 10/2013 |

OTHER PUBLICATIONS

U.S. Appl. No. 14/044,364, filed Oct. 2, 2013 entitled Battery Cell Assembly.

* cited by examiner

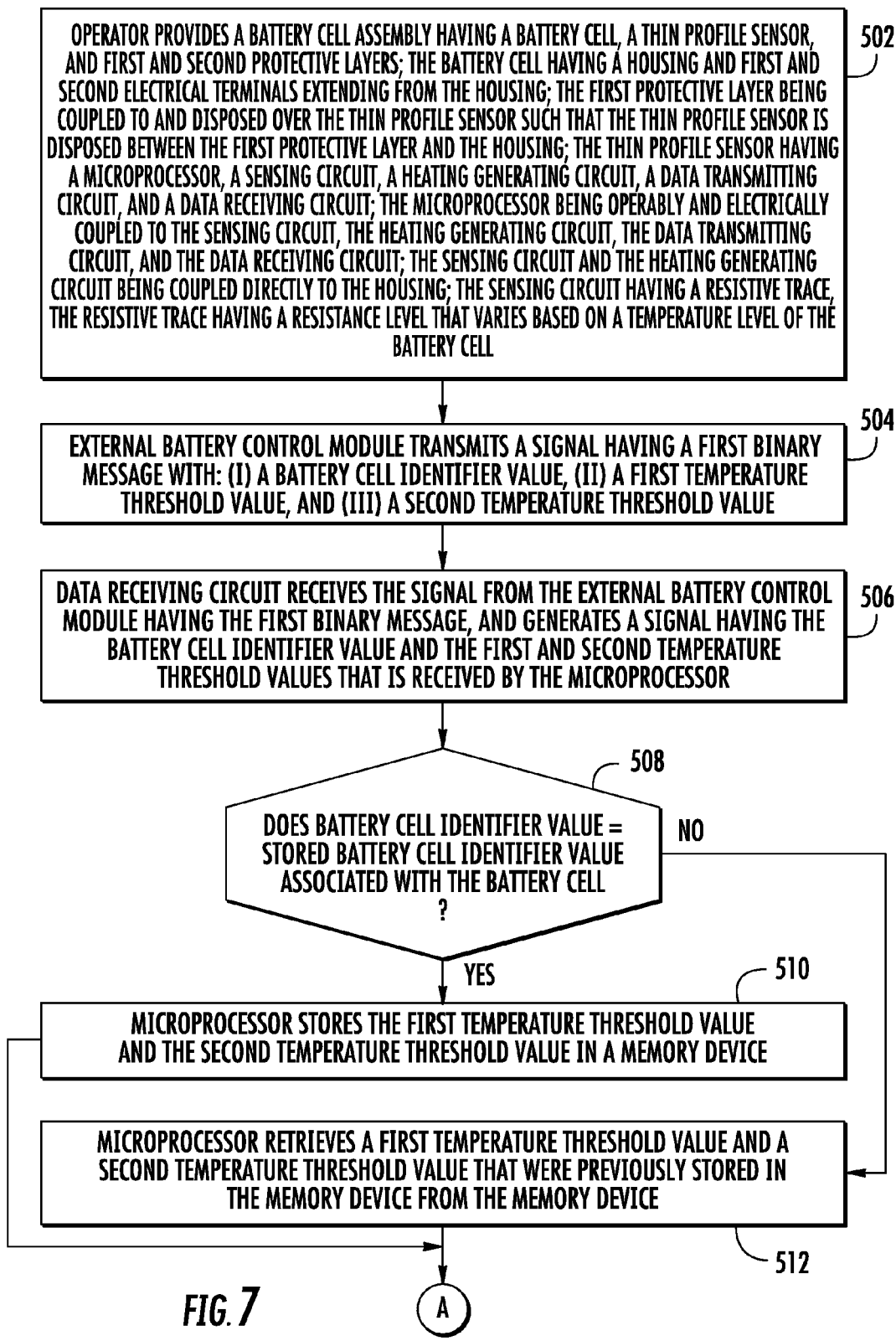

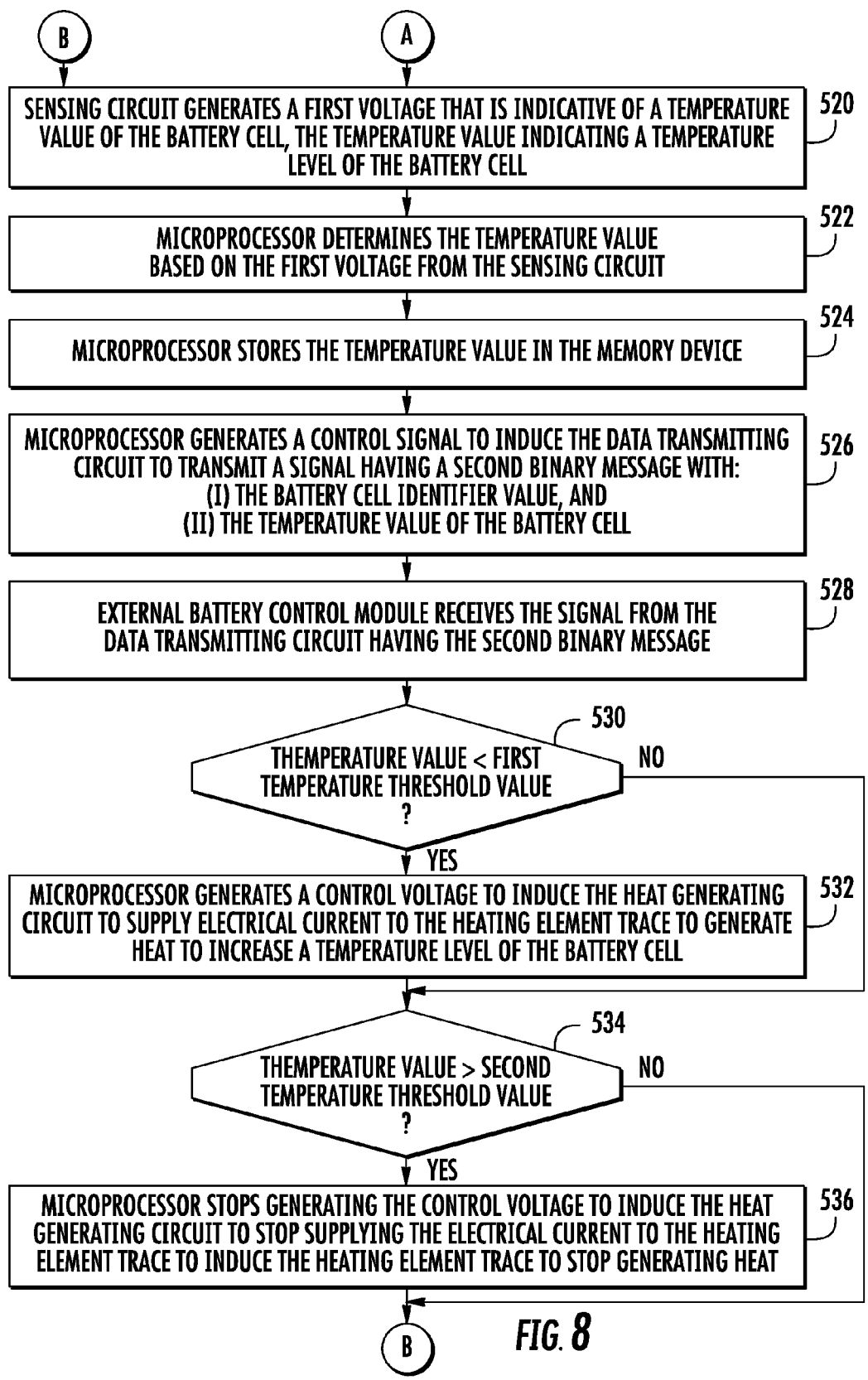

BATTERY CELL ASSEMBLY HAVING IMPROVED THERMAL SENSING CAPABILITY

BACKGROUND

The inventor herein has recognized a need for a battery cell assembly that utilizes a thin profile sensor coupled directly to a housing of a battery cell for determining operational parameter values associated with the battery cell.

SUMMARY

A battery cell assembly in accordance with an exemplary embodiment is provided. The battery cell assembly includes a battery cell having a housing and first and second electrical terminals extending from the housing. The battery cell assembly further includes a thin profile sensor disposed directly on the housing. The thin profile sensor has a microprocessor and a sensing circuit. The sensing circuit is coupled directly to the housing. The microprocessor and the sensing circuit are operably coupled together. The sensing circuit is configured to generate a signal that is indicative of an operational parameter value of the battery cell. The microprocessor is programmed to determine the operational parameter value based on the signal from the sensing circuit. The microprocessor is further programmed to store the operational parameter value in a memory device. The battery cell assembly further includes a protective layer that is coupled to and disposed over the thin profile sensor such that the thin profile sensor is disposed between the protective layer and the housing.

BRIEF DESCRIPTION OF THE DRAWINGS

FIGS. 7 and 8 are flowcharts of a method for determining an operational parameter associated with the battery cell assembly, and for controlling the operational parameter value utilizing the thin profile sensor of FIG. 6.

DETAILED DESCRIPTION

Figure 1:
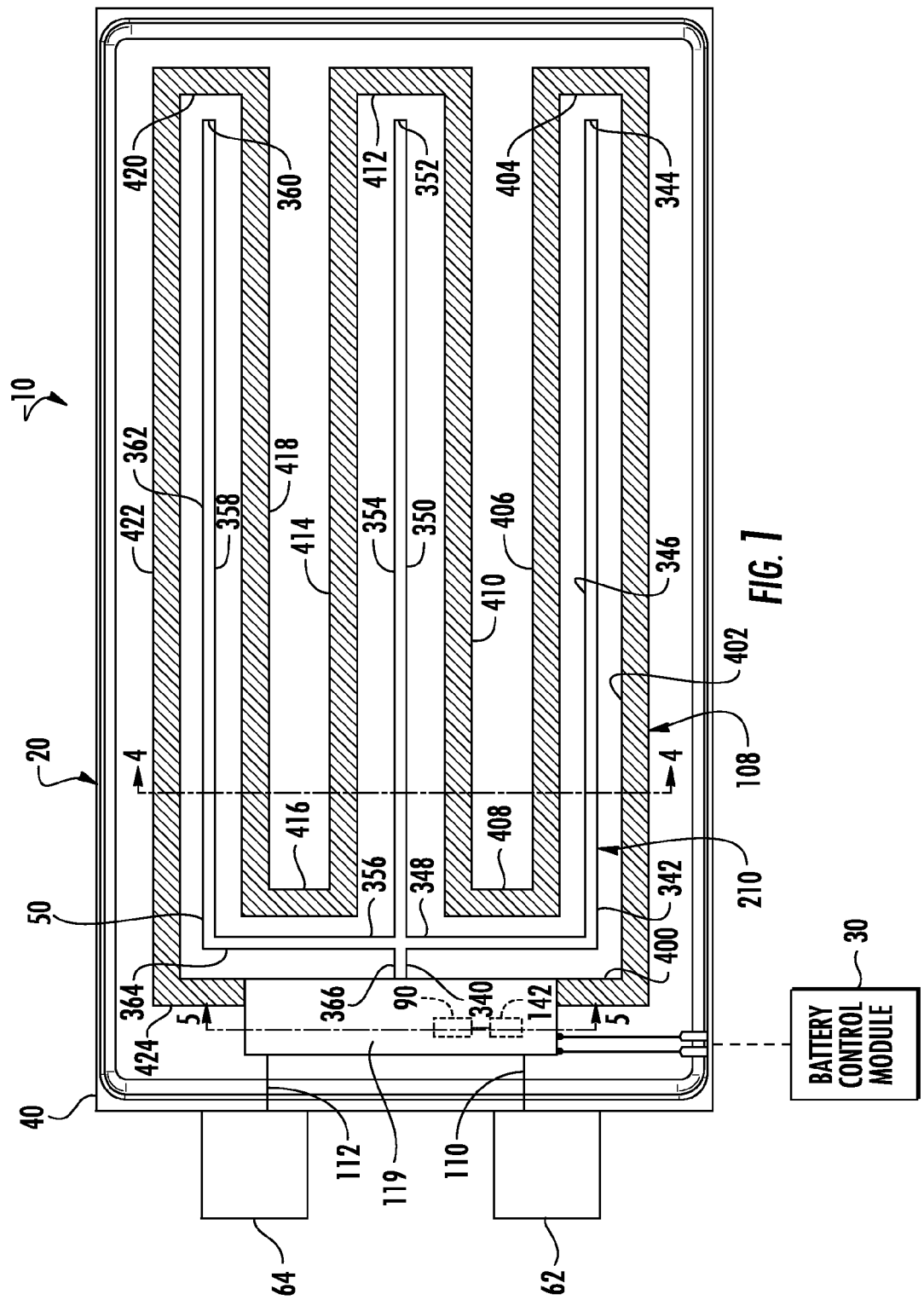
FIG. 1 is a schematic of a battery system having a battery cell assembly and a battery control module.
Figure 2:
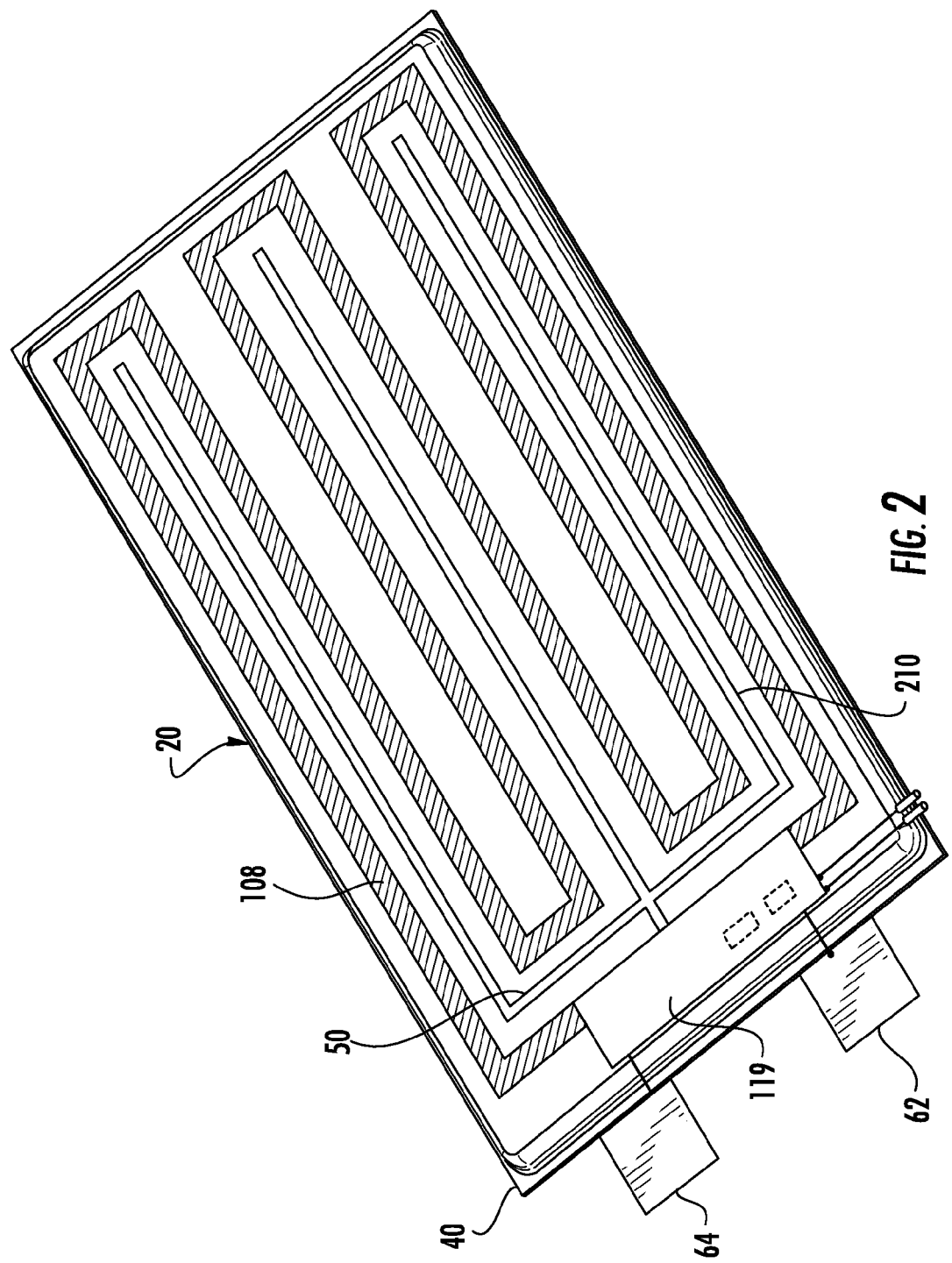
FIG. 2 is a schematic of a first side of the battery cell assembly of FIG. 1 in accordance with an exemplary embodiment.
Figure 3:
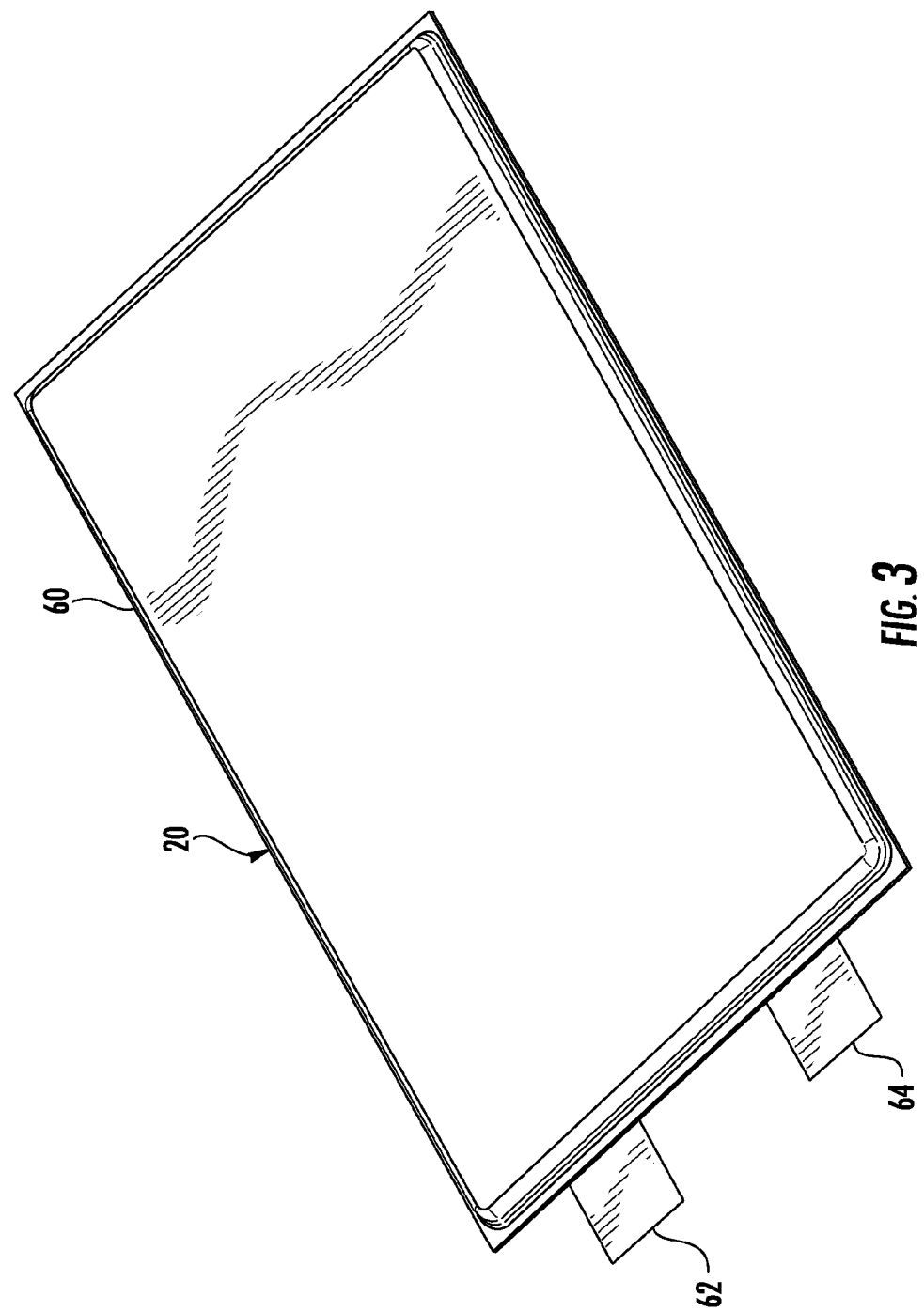
FIG. 3 is a schematic of a second side of the battery cell assembly of FIG. 1.

Referring to FIGS. 1 and 2, a battery system 10 having a battery cell assembly 20 in accordance with an exemplary embodiment, and a battery control module 30 is provided.

Referring to FIGS. 1, 3, 5 and 7, the battery cell assembly 20 includes a battery cell 40, a thin profile sensor 50, and protective layers 52, 54. An advantage of the battery cell assembly 20 is that the thin profile sensor 50 is coupled to and disposed directly to a housing 60 of the battery 40 and determines an operational parameter value associated with the battery cell 40, and controls an operational parameter of the battery cell 40 based on the operational parameter value. In particular, in an exemplary embodiment, the thin profile sensor 50 determines a temperature value associated with the battery cell 40 utilizing a sensing circuit 100, and controls a heat generating circuit 108 to adjust a temperature level of the battery cell 40 based on the temperature value.

For purposes of understanding, the term "trace" means a thin electrically conductive member herein.

Referring to FIGS. 1-5, the battery cell 40 has a housing 60 and electrical terminals 62, 64 extending from the housing 60. The battery cell 40 further includes a plastic layer 70, an anode layer 72, a separator layer 74, a cathode layer 76, and a plastic layer 78. The anode layer 72 is coupled between and to the plastic layer 70 and the separator layer 74. The anode layer 72 is electrically coupled to the electrical terminal 62. The cathode layer 76 is coupled between and to the separator layer 74 and the plastic layer 78. The cathode layer 76 is electrically coupled to the electrical terminal 64. The anode layer 72 and the cathode layer 76 generate a voltage between the electrical terminals 62, 64. In an exemplary embodiment, the battery cell 40 is a lithium-ion pouch-type battery cell. Further, in the exemplary embodiment, the housing 60 (shown in FIG. 3) is substantially rectangular-shaped and has an outer surface 66 (shown in FIG. 4). In an alternative embodiment, the battery cell 40 could be another type of battery cell such as a nickel-metal-hydride battery cell, or a nickel-cadmium battery cell for example. Further, in an alternative embodiment, the housing 60 of the battery cell 40 could have another shape such as a cylindrical shape for example. Still further, in an alternative embodiment, the battery cell 40 could be replaced with another type of energy storage cell. For example, the battery cell 40 could be replaced with an ultracapacitor with first and second electrical terminals extending therefrom, or replaced with a supercapacitor with first and second electrical terminals extending therefrom.

Figure 4:
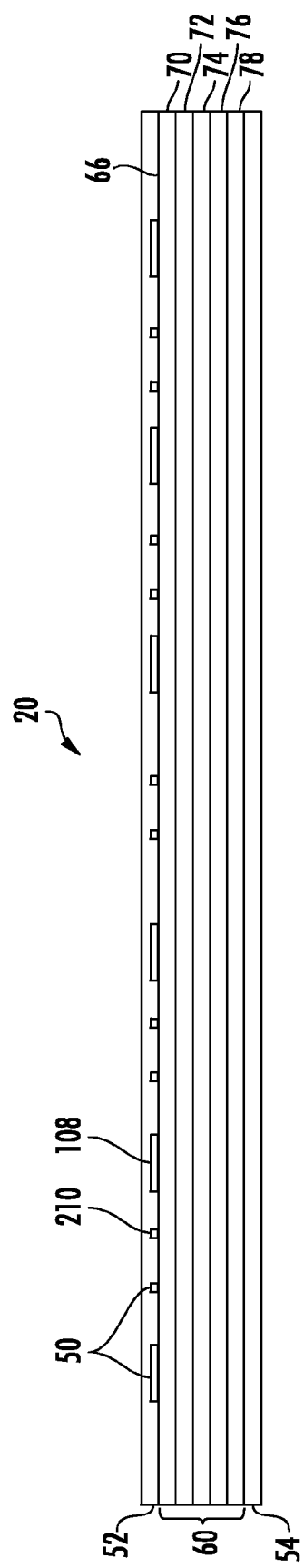
FIG. 4 is a cross-sectional schematic of a portion of the battery cell assembly of FIG. 1 taken along lines 4-4.
Figure 5:
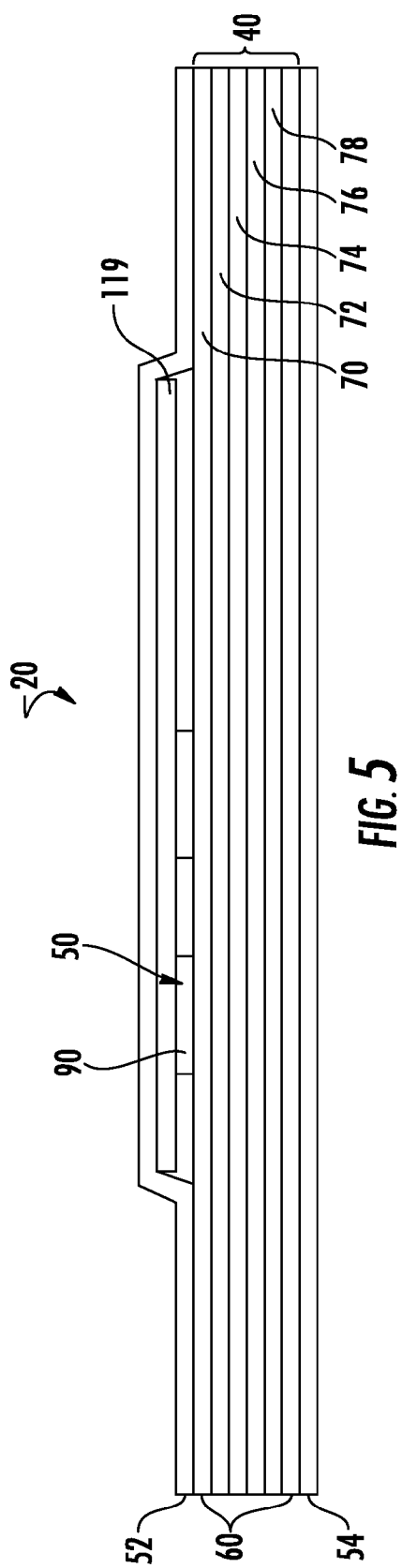
FIG. 5 is a cross-sectional schematic of another portion of the battery cell assembly of FIG. 1 taken along lines 5-5.
Figure 6:
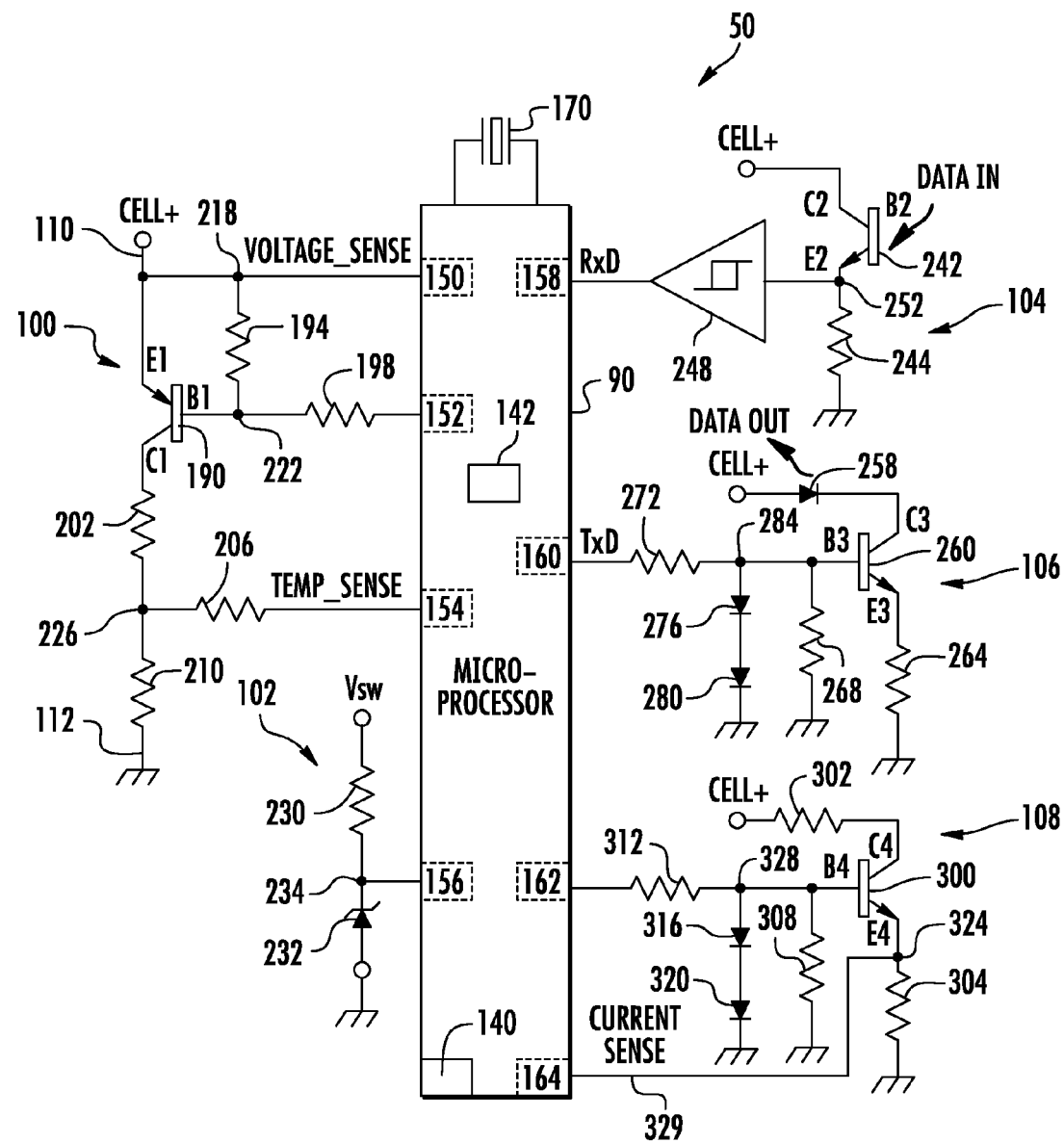
FIG. 6 is an electrical schematic of a thin profile sensor utilized in the battery cell assembly of FIG. 1 having a sensing circuit, a reference voltage circuit, a data transmitting circuit, a data receiving circuit, and a heat generating circuit.

Referring to FIGS. 4-6, the thin profile sensor 50 is configured to determine an operational parameter value of the battery cell 40 and to control an operational parameter of the battery cell 40 based on the operational parameter value. For example, in an exemplary embodiment, the thin profile sensor 50 utilizes the sensing circuit 100 to determine a temperature value of the battery cell 40, and controls the heat generating circuit 108 to adjust a temperature level of the battery cell 40 based on the temperature value.

The thin profile sensor 50 includes a microprocessor 90, a sensing circuit 100, a reference voltage circuit 102, a data receiving circuit 104, a data transmitting circuit 106, a heat generating circuit 108, and leads 110, 112. The microprocessor 90 is operably and electrically coupled to the sensing circuit 100, the data receiving circuit 104, the data transmitting circuit 106, and the heat generating circuit 108. In an exemplary embodiment, the sensing circuit 100 and the heat generating circuit 108 are coupled to and disposed directly on the outer surface 66 (shown in FIG. 4) of the housing 60. Further, at least a portion of the data receiving circuit 104 and the data transmitting circuit 106 are coupled to and disposed directly on the outer surface 66 of the housing 60.

Referring to FIGS. 1, 2, 5 and 6, the microprocessor 90 is programmed to determine an operational parameter value (e.g., temperature value) of the battery cell 40 and to control an operational parameter (e.g., temperature level) of the battery cell 40 based on the operational parameter value, as will be described in greater detail below. The microprocessor 90 includes a memory device 140, an analog-to-digital converter 142 having input-output (I/O) ports 150, 152, 154, 156, 158, 160, 162, and an oscillator 170. The microprocessor 90 is electrically coupled to the electrical terminals 62, 64 of the battery cell 40 via the leads 110, 112. The electrical terminals 62, 64 are configured to supply an operational voltage to the microprocessor 90. In an exemplary embodiment, the microprocessor 90 is coupled to and disposed directly on a circuit board 119 (shown in FIG. 5), and the circuit board 119 is coupled to and between the protective layer 52 and the plastic layer 70. In an alternative embodiment, the microprocessor 90 is coupled to and disposed directly on the outer surface 66 of the housing 60 of the battery cell 40 utilizing an adhesive or another attachment means. In this alternative embodiment, the circuit board 119 can be removed from the battery cell assembly 20. The microprocessor 90 utilizes software instructions and/or data stored in the memory device 140 to implement at least part of the tasks described herein with respect to the microprocessor 90.

The sensing circuit 100 is configured to generate a signal that is indicative of an operational parameter value (e.g., temperature value) of the battery cell 40. In the illustrated embodiment, the sensing circuit 100 is coupled to and disposed directly on the outer surface 66 of the housing 60. Of course, in an alternative embodiment, at least some of the components of the sensing circuit 100 could be coupled to and disposed directly on the circuit board 119 (shown in FIG. 5) which is further coupled to the housing 60. The sensing circuit 100 includes a transistor 190, resistors 194, 198, 202, 206, a resistive trace 210, and nodes 218, 222, 226. The resistive trace 210 has a resistance level that varies based on a temperature level of the battery cell 40.

Referring to FIG. 6, the transistor 190 includes a base B1, an emitter E1, and a collector C1. The emitter E1 is electrically coupled to a node 218 which is further electrically coupled to an operational voltage on a positive electrical terminal of the battery cell 40. The node 218 is further electrically coupled to the I/O port 150 of the microprocessor 90. The base B1 is electrically coupled to a node 222. The resistor 194 is electrically coupled between the node 222 and the node 218. Further, the resistor 198 is electrically coupled between the node 222 and the I/O port 152. The resistor 202 is electrically coupled between the collector C1 and the node 226. Further, the resistive trace 210 is electrically coupled between the node 226 and a negative electrical terminal of the battery cell 40. Thus, the resistor 202 is electrically coupled in series with the resistive trace 210, and the electrical node 226 is electrically coupled therebetween. The resistor 202 is further electrically coupled to an operational voltage when the transistor 190 is turned on. The resistor 206 is electrically coupled between the node 226 and the I/O port 154.

Referring to FIGS. 1 and 6, the resistive trace 210 has a resistance level that varies based on a temperature level of the battery cell 40, and is used by the microprocessor 90 to determine the temperature level of the battery cell 40. In an exemplary embodiment, the resistive trace 210 is coupled to and disposed directly on the outer surface 66 (shown in FIG. 4) of the housing 60. The resistive trace 210 includes resistive trace portions 340, 342, 344, 346, 348, 350, 352, 354, 356, 358, 360, 362, 364, 366 which are electrically coupled in series to one another. As shown, the resistive traces 342, 346, 350, 354, 358, 362 are spaced apart from one another and extend substantially parallel to one another longitudinally along the first side 130 of the flexible plastic sheet 80. In an exemplary embodiment, the resistive trace 210 has a thickness in a range of 0.33-1.0 millimeters. Of course, in an alternative embodiment, the resistive trace 210 could have a thickness greater than 1.0 millimeter. In an exemplary embodiment, the resistive trace 210 is printed on the outer surface 66 of the housing 60 and is constructed of at least one of graphite, nickel, tin, silver, copper, or an alloy of at least two of the foregoing materials.

In an alternative embodiment, the resistive trace 210 could have a different configuration on the housing 60. For example, the resistive trace 210 could comprise a first plurality of trace portions that extend parallel to one another that are coupled together at end regions thereof with one or more trace portions disposed substantially perpendicular to the first plurality of trace portions to provide desired temperature sensing coverage of the battery cell 40. Further, for example, the resistive trace 210 could comprise another combination of parallel extending trace portions coupled to one or more series trace portions to provide desired temperature sensing coverage of the battery cell 40.

Since the resistive trace 210 has a resistance that varies based on a temperature of the battery cell 40, when the transistor 190 is turned on, a voltage at the node 226 is indicative of a temperature level of the battery cell 40. Still further, a voltage applied to the I/O port 154 is further indicative of a temperature level of the battery cell 40.

To determine a temperature level of the battery cell 40, the microprocessor 90 is programmed to output a low logic level voltage on the I/O port 152 to turn on the transistor 190. When the transistor 190 is turned on, the microprocessor 90 is programmed to measure the voltage (temp_sense) on the resistor 206 at the I/O port 154. The microprocessor 90 is further programmed to determine a temperature value representing the temperature level of the battery cell 40 based on the voltage (temp_sense). In an exemplary embodiment, the microprocessor 90 utilizes a lookup table stored in the memory device 140 that has a plurality of voltage values (corresponding to voltage levels at the I/O port 154) and a plurality of associated temperature levels of the battery cell 40. The microprocessor 90 utilizes a measured voltage level to access an associated temperature value in the lookup table, which corresponds to a temperature level of the battery cell 40.

The microprocessor 90 is further programmed to measure a voltage on the I/O port 150 to determine either a $V_{open}$ or a $V_{load}$ voltage of the battery cell 40. In particular, the microprocessor 90 measures a voltage on the I/O port 150 when the transistor 300 is turned off which corresponds to the $V_{open}$ voltage level of the battery cell 40. Alternately, the microprocessor measures a voltage on the I/O port 151 the transistor 300 is turned on, which corresponds to the $V_{load}$ voltage level of the battery cell 40.

The reference voltage circuit 102 is provided to input a reference voltage to the I/O port 156 of the microprocessor 90. In the illustrated embodiment, the reference voltage circuit 102 is coupled to and disposed directly on the circuit board 119 (shown in FIG. 1). Of course, in an alternative embodiment, at least some of the components of the reference voltage circuit 102 could be coupled to and disposed directly on the outer surface 66 of the housing 60. The reference voltage circuit 102 includes a resistor 230, a diode 232, and a node 234. The resistor 230 is electrically coupled between an operational voltage and the node 234. The diode 232 is electrically coupled between the node 234 and a negative electrical terminal of the battery cell 40. The node 234 is further electrically coupled to the I/O port 156.

Referring to FIGS. 1 and 6, the data receiving circuit 104 is provided to allow the thin profile sensor 50 to receive data from the battery control module 30. In the illustrated embodiment, at least some of the components of the data receiving circuit 104 are coupled to and disposed directly on the circuit board 119 (shown in FIG. 1). Of course, in an alternative embodiment, at least some of the components of the data receiving circuit 104 could be coupled to and disposed directly on the outer surface 66 of the housing 60. The data receiving circuit 104 includes an infrared receiving transistor 242, a resistor 244, a voltage buffer 248, and the node 252. The transistor 242 includes a base B2, a collector C2, and an emitter E2. The collector C2 is electrically coupled to a positive voltage terminal of the battery cell 40. The emitter E2 is electrically coupled to a node 252 which is further coupled to the resistor 244. The resistor 244 is electrically coupled between the node 252 and a negative electrical terminal of the battery cell 40. The voltage buffer 248 is electrically coupled between the node 252 and the I/O port 158 of the microprocessor 90. When the base B2 receives infrared light having a threshold light level, the transistor 242 turns on and supplies a voltage through the voltage buffer 248 to the I/O port 158. Accordingly, when the infrared light has a binary message contained therein, the transistor 242 iteratively turns on and off to supply a binary voltage message through the voltage buffer 248 to the I/O port 158.

The data receiving circuit 104 is configured to receive a signal having a binary message therein corresponding to a threshold operational parameter value associated with the battery cell 40. For example, in an exemplary embodiment, the signal corresponds to an infrared light signal. Further, in an exemplary embodiment, the threshold operational parameter value corresponds to at least one threshold temperature value of the battery cell 40. Of course, in an alternative embodiment, the data receiving circuit 104 could have a radio frequency (RF) receiver operably coupled to the I/O port 158, and the received signal having the binary message could correspond to an RF signal. Further, in an alternative embodiment, the threshold operational parameter value could correspond to another threshold parameter value associated with the battery cell 40.

After receiving the signal with the binary message therein, the data receiving circuit 104 is further configured to output a voltage signal having the binary message in response to the received signal. The binary message represents the threshold operational parameter value of the battery cell 40, and is received by the microprocessor 90. In an exemplary embodiment, the binary message has a threshold operational parameter value corresponding to at least one threshold temperature value of the battery cell 40.

The data transmitting circuit 106 is provided to allow the thin profile sensor 50 to transmit data to the battery control module 30. In particular, the microprocessor 90 is programmed to generate a control signal to induce the data transmitting circuit 106 to transmit a signal having a first binary message therein representing a measured operational parameter value of the battery cell 40. In the illustrated embodiment, at least some of the components of the data transmitting circuit 106 are coupled to and disposed directly on the circuit board 119 (shown in FIG. 1). Of course, in an alternative embodiment, at least some of the components of the data transmitting circuit 106 could be coupled to and disposed directly on the outer surface 66 of the housing 60. The data transmitting circuit 106 includes an infrared transmitting diode 258, the transistor 260, resistors 264, 268, 272, diodes 276, 280, and a node 284.

The transistor 260 includes a base B3, a collector C3, and an emitter E3. The infrared transmitting diode 258 is electrically coupled between the collector C3 and the positive electrical terminal of the battery cell 40. The resistor 264 is electrically coupled between the emitter E3 and a negative electrical terminal of the battery cell 40. The resistor 268 is electrically coupled between the base B3 and a negative electrical terminal of the battery cell 40. The base B3 is further electrically coupled to a node 284. The diodes 276, 280 electrically coupled in series between the node 284 and a negative electrical terminal of the battery cell 40. The resistor 272 is electrically coupled between the node 284 and the I/O port 160 of the microprocessor 90.

When the microprocessor 90 directs the I/O port 160 to output a high logic level voltage, the transistor 260 turns on and the infrared transmitting diode 258 emits infrared light. Accordingly, when the microprocessor 90 desires to output a signal having a binary message therein corresponding to a measured operational parameter value of the battery cell 40, the microprocessor 90 controls the voltage output by the I/O port 160 to generate the infrared light signal having the binary message therein. In an exemplary embodiment, the binary message has a measured operational parameter value corresponding to a measured temperature value of the battery cell 40.

Referring to FIGS. 1, 2 and 6, the heat generating circuit 108 is provided to increase a temperature level of the battery cell 40 when a temperature level of the battery cell 40 is less than a threshold temperature level. In the illustrated embodiment, at least some of the components of the heat generating circuit 108 are coupled directly to the outer surface 66 (shown in FIG. 4) of the housing 60. Of course, in an alternative embodiment, at least some of the components of the heat generating circuit 108 could be disposed on the circuit board 119 (shown in FIG. 4) which is further coupled to the housing 60. The heat generating circuit 108 includes a transistor 300, a heating element trace 302, resistors 304, 308, 312, diodes 316, 320, nodes 324, 328, and a sense line 329.

The transistor 300 includes a base B4, a collector C4, and an emitter E4. The heating element trace 302 is electrically coupled between the collector C4 and the positive electrical terminal of the battery cell 40. The resistor 304 is electrically coupled between the emitter E4 and a negative electrical terminal of the battery cell 40. The sense line 329 is electrically coupled between the emitter E4 and the I/O port 164 of the microprocessor 90. The base B4 is electrically coupled to a node 328. The diodes 316, 320 are electrically coupled in series between the node 328 and a negative electrical terminal of the battery cell 40. The resistor 312 is electrically coupled between the node 328 and the I/O port 162 of the microprocessor 90.

The heating element trace 302 is configured to generate heat when a voltage is applied across the heating element trace 302. In the illustrated embodiment, the heating element trace 302 is a substantially serpentine-shaped heating element trace coupled to and disposed directly on the flexible plastic sheet 80. Further, the heating element trace 302 includes heating element trace portions 400, 402, 404, 406, 408, 410, 412, 414, 416, 418, 420, 422, 424 coupled in series with one another. Further, in the exemplary embodiment, the heating element trace 302 is printed on the outer surface 66 of the housing 60 and is constructed of at least one of graphite, nickel, tin, silver, copper, or an alloy of at least two of the foregoing materials. In an alternative embodiment, the heating element trace 302 could have a different configuration on the flexible plastic sheet 80. For example, the heating element trace 302 could comprise a first plurality of heating element trace portions that extend parallel to one another that are coupled together at end regions thereof with one or more heating element trace portions disposed substantially perpendicular to the first plurality of heating element trace portions to provide desired heating coverage of the battery cell 40. Further, for example, the heating element trace 302 could comprise another combination of parallel extending heating element trace portions coupled to one or more series heating element trace portions to provide desired heating coverage of the battery cell 40.

During operation, the microprocessor 90 is programmed to generate a control voltage to induce the transistor 300 of the heat generating circuit 108 to supply electrical current to the heating element trace 302 to generate heat if the temperature value of the battery cell 40 is less than a first threshold temperature level. Further, the microprocessor 90 is programmed to stop generating the control voltage to induce the transistor 300 of the heat generating circuit 108 to stop supplying the electrical current to the heating element trace 302 to induce the heating element trace 302 to stop generating heat if the temperature value of the battery cell 40 is greater than a second threshold temperature value.

The microprocessor 90 is further programmed to determine an $I_{load}$ current value by measuring a voltage at the node 324 when the transistor 300 is turned on. The microprocessor 90 calculates the $I_{load}$ current value utilizing the following equation: $I_{load}$=voltage at node 324/known resistance value of resistor 304.

Referring to FIG. 4, the protective layer 52 is coupled to and disposed over the thin profile sensor 50 such that the thin profile sensor 50 is disposed between the protective layer 52 and the plastic layer 70 of the housing 60. In an exemplary embodiment, the protective layer 52 is constructed of a thin plastic layer. Further, in the exemplary embodiment, the protective layer 52 is a substantially transparent plastic layer.

The protective layer 54 is coupled to and disposed over a side of the plastic layer 78 of the housing 60. In an exemplary embodiment, the protective layer 54 is constructed of a thin plastic layer. Further, in the exemplary embodiment, the protective layer 54 is a substantially transparent plastic layer.

Referring to FIGS. 1 and 6-8, a flowchart of a method for determining an operational parameter value associated with a battery cell 40 and for controlling an operational parameter of the battery cell 40 based on the operational parameter value will now be described.

At step 502, an operator provides the battery cell assembly 20 having the battery cell 40, the thin profile sensor 50, and the protective layers 52, 54. The battery cell 40 has a housing 60 and first and second electrical terminals 62, 64 extending from the housing 60. The protective layer 52 is coupled to and disposed over the thin profile sensor 50 such that the thin profile sensor 50 is disposed between the protective layer 52 and the housing 60. The thin profile sensor 50 has the microprocessor 90, the sensing circuit 100, the heating generating circuit 108, the data transmitting circuit 106, and the data receiving circuit 104. The microprocessor 90 is operably and electrically coupled to the sensing circuit 100, the heating generating circuit 108, the data transmitting circuit 106, and the data receiving circuit 104. The sensing circuit 100 and the heating generating circuit 108 are coupled directly to the housing 60. The sensing circuit 100 has a resistive trace 210. The resistive trace 210 has a resistance level that varies based on a temperature level of the battery cell 40. After step 502, the method advances to step 504.

At step 504, the external battery control module 30 transmits a signal having a first binary message with: (i) a battery cell identifier value, (ii) a first temperature threshold value, and (iii) a second temperature threshold value. After step 504, the method advances to step 506.

At step 506, the data receiving circuit 104 receives the signal from the external battery control module 30 having the first binary message, and generates a signal having the battery cell identifier value and the first and second temperature threshold values that is received by the microprocessor 90. After step 506, the method advances to step 508.

At step 508, the microprocessor 90 makes a determination as to whether the battery cell identifier value equals a stored battery cell identifier value associated with the battery cell 40. The stored battery cell identifier value is stored in the memory device 140 prior to step 508. If the value of step 508 equals "yes", the method advances to step 510. Otherwise, the method advances to step 512.

At step 510, the microprocessor 90 stores the first temperature threshold value and the second temperature threshold value in the memory device 140. After step 510, the method advances to step 520.

Referring again to step 508, if the value of step 508 equals "no", the method advances to step 512. At step 512, the microprocessor 90 retrieves a first temperature threshold value and a second temperature threshold value that were previously stored in the memory device 140. After step 512, the method advances to step 520.

At step 520, the sensing circuit 100 generates a first voltage that is indicative of a temperature value of the battery cell 40. The temperature value indicates a temperature level of the battery cell 40. After step 520, the method advances to step 522.

At step 522, the microprocessor 90 determines the temperature value of the battery cell 40 based on the first voltage from the sensing circuit 100. In particular, in an exemplary embodiment, the microprocessor 90 accesses a lookup table stored in the memory device 140 that associates a plurality of temperature values of the battery cell 40 with a plurality of the voltages from the sensing circuit 100, to select a temperature value utilizing the first voltage as an index to the lookup table. After step 522, the method advances to step 524.

At step 524, the microprocessor 90 stores the temperature value in the memory device 140. After step 524, the method advances to step 526.

At step 526, the microprocessor 90 generates a control signal to induce the data transmitting circuit 106 to transmit a signal having a second binary message with: (i) the battery cell identifier value, and (ii) the temperature value of the battery cell 40. After step 526, the method advances to step 528.

At step 528, the external battery control module 30 receives the signal from the data transmitting circuit 106 having the second binary message.

At step 530, the microprocessor makes a determination as to whether the temperature value is less than the first threshold temperature value. If the value of step 530 equals "yes", the method advances to step 532. Otherwise, the method advances to step 534.

At step 532, the microprocessor 90 generates a control voltage to induce the heat generating circuit 108 to supply electrical current to the heating element trace 302 to generate heat to increase a temperature level of the battery cell 40. After step 532, the method advances to step 534.

At step 534, the microprocessor 90 makes a determination as to whether the temperature value is greater than a second threshold temperature value. The second threshold temperature value is greater than the first threshold temperature value. If the value of step 534 equals "yes", the method advances to step 536. Otherwise, the method returns to step 520.

At step 536, the microprocessor 90 stops generating the control voltage to induce the heat generating circuit 108 to stop supplying the electrical current to the heating element trace 302 to induce the heating element trace 302 to stop generating heat. After step 536, the method returns to step 520.

The above-described method can be at least partially embodied in the form of one or more computer readable media having computer-executable instructions for practicing the methods. The computer-readable media can comprise one or more of the following: hard drives, RAM, ROM, flash memory, and other computer-readable media known to those skilled in the art; wherein, when the computer-executable instructions are loaded into and executed by one or more microprocessors, the one or more microprocessors become an apparatus for practicing the methods.

The battery cell assembly provides a substantial advantage over other assemblies. In particular, battery cell assembly provides a technical effect of utilizing a thin profile sensor coupled to an exterior surface of the battery cell to determine an operational parameter value associated with the battery cell, and to control an operational parameter of the battery cell based on the operational parameter value. In particular, the thin profile sensor determines a temperature value associated with the battery cell utilizing a sensing circuit, and controls a heat generating circuit to adjust a temperature level of the battery cell based on the temperature value.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
a pouch-type battery cell having a pouch-type housing and first and second electrical terminals extending from the pouch-type housing;
a temperature sensor being disposed directly on an outer surface of the pouch-type housing of the pouch-type battery cell, the temperature sensor having a microprocessor, a circuit board, a sensing circuit, a heat generating circuit, and a data transmitting circuit; the microprocessor being coupled directly to the circuit board, and the microprocessor further directly contacting an outer surface of the pouch-type housing of the pouch-type battery cell, the circuit board directly contacting a protective layer such that the circuit board is disposed between the protective layer and the microprocessor, the protective layer having a periphery that is greater than a periphery of the circuit board, the sensing circuit having a resistive trace being coupled directly to and contacting the outer surface of the pouch-type housing of the pouch-type battery cell; the resistive trace having a resistance level that varies based on a temperature level of the pouch-type battery cell, the microprocessor and the sensing circuit being operably coupled together;
the microprocessor being programmed to determine a temperature value corresponding to the temperature level of the pouch-type battery cell based on a signal from the sensing circuit;
the microprocessor being further programmed to store the temperature value in a memory device;
the heat generating circuit having a heating element trace being disposed and printed directly on the outer surface of the pouch-type housing, the heating element trace being electrically coupled to the microprocessor;
the protective layer being further coupled to and disposed over the temperature sensor such that the resistive trace is disposed between the protective layer and the outer surface of the pouch-type housing of the pouch-type battery cell; and
the data transmitting circuit being coupled at least in part to the circuit board, the microprocessor being further programmed to generate a control signal to induce the data transmitting circuit to transmit a first signal having a first binary message therein externally through air, the first binary message representing the temperature value of the pouch-type battery cell.

2. The battery cell assembly of claim 1, wherein:
the signal comprises a first voltage on the sensing circuit.

3. The battery cell assembly of claim 2, wherein the sensing circuit further includes first and second resistors, the first resistor being coupled in series with the resistive trace with an electrical node therebetween, the first resistor being further electrically coupled to an operational voltage, the second resistor being coupled between the electrical node and the microprocessor, the microprocessor being further programmed to measure the first voltage on the second resistor, the microprocessor being further programmed to determine the temperature value representing the temperature level of the pouch-type battery cell based on the first voltage.

4. The battery cell assembly of claim 1, wherein the resistive trace has a thickness in a range of 0.33-1.0 millimeters.

5. The battery cell assembly of claim 1, wherein the resistive trace has at least first, second and third resistive trace portions spaced apart from one another and extending substantially parallel to one another, the first, second, and third resistive portions electrically coupled in series to one another and extending longitudinally along the pouch-type housing of the pouch-type battery cell.

6. The battery cell assembly of claim 1, wherein the resistive trace is constructed of at least one of graphite, nickel, tin, silver, copper, or an alloy of at least two of the foregoing materials.

7. The battery cell assembly of claim 1, wherein the heating element trace is a substantially serpentine-shaped heating element trace.

8. The battery cell assembly of claim 1, wherein the heating element trace is constructed of at least one of graphite, nickel, tin, silver, copper, or an alloy of at least two of the foregoing materials.

9. The battery cell assembly of claim 1, wherein the microprocessor is further programmed to generate a control voltage to induce the heat generating circuit to supply electrical current to the heating element trace to generate heat if the temperature value of the pouch-type battery cell is less than a first threshold temperature level.

10. The battery cell assembly of claim 9, wherein the microprocessor is further programmed to stop generating the control voltage to induce the heat generating circuit to stop supplying the electrical current to the heating element trace to induce the heating element trace to stop generating heat if the temperature value of the pouch-type battery cell is greater than or equal to a second threshold temperature value.

11. The battery cell assembly of claim 1, wherein the microprocessor is electrically coupled to the first and second electrical terminals of the pouch-type battery cell, the first and second electrical terminals configured to supply an operational voltage to the microprocessor.

12. The battery cell assembly of claim 1, wherein the first signal is a first infrared signal having the first binary message therein representing the temperature value of the pouch-type battery cell.

13. The battery cell assembly of claim 12, wherein the temperature sensor further includes a data receiving circuit being coupled at least in part to the circuit board, the data receiving circuit configured to receive a second infrared signal having a second binary message therein, and to output a voltage signal having the second binary message in response to the received second signal, the second binary message having an operational parameter threshold value and is received by the microprocessor.

14. The battery cell assembly of claim 13, wherein the operational parameter threshold value comprises a temperature threshold value of the pouch-type battery cell.

15. A battery cell assembly, comprising:
a pouch-type battery cell having a pouch-type housing and first and second electrical terminals extending from the pouch-type housing;
a temperature sensor being coupled to an outer surface of the pouch-type housing of the pouch-type battery cell, the temperature sensor having a microprocessor, a sensing circuit, and a heat generating circuit;
the sensing circuit having a resistive trace being coupled directly to and contacting the outer surface of the pouch-type housing of the pouch-type battery cell; the resistive trace having a resistance level that varies based on a temperature level of the pouch-type battery cell, the microprocessor and the sensing circuit being operably coupled together, the sensing circuit generating a signal that is indicative of the temperature level of the pouch-type battery cell;
the heat generating circuit having a heating element trace being disposed and printed directly on the outer surface of the pouch-type housing, the heating element trace being electrically coupled to the microprocessor;
a protective layer being coupled to and disposed over the temperature sensor such that the resistive trace and the heating element trace are disposed between the protective layer and the outer surface of the pouch-type housing of the pouch-type battery cell;
the microprocessor being programmed to determine a temperature value corresponding to the temperature level of the pouch-type battery cell based on the signal from the sensing circuit;
the microprocessor being further programmed to store the temperature value in a memory device; and
the microprocessor being further programmed to generate a control signal to induce the data transmitting circuit to transmit a first infrared signal having a first binary message therein, the first binary message representing the temperature value of the pouch-type battery cell.

16. The battery cell assembly of claim 15, wherein the microprocessor is further programmed to generate a control voltage to induce the heat generating circuit to supply electrical current to the heating element trace to generate heat if the temperature value of the pouch-type battery cell is less than a first threshold temperature level; and
the microprocessor is further programmed to stop generating the control voltage to induce the heat generating circuit to stop supplying the electrical current to the heating element trace to induce the heating element trace to stop generating heat if the temperature value of the pouch-type battery cell is greater than or equal to a second threshold temperature value.

17. The battery cell assembly of claim 15, wherein the microprocessor being coupled directly on the outer surface of the pouch-type housing of the pouch-type battery cell utilizing an adhesive.

18. The battery cell assembly of claim 15, wherein the data transmitting circuit being coupled to and disposed directly on the outer surface of the pouch-type housing.

* * * * *